Figure 1:
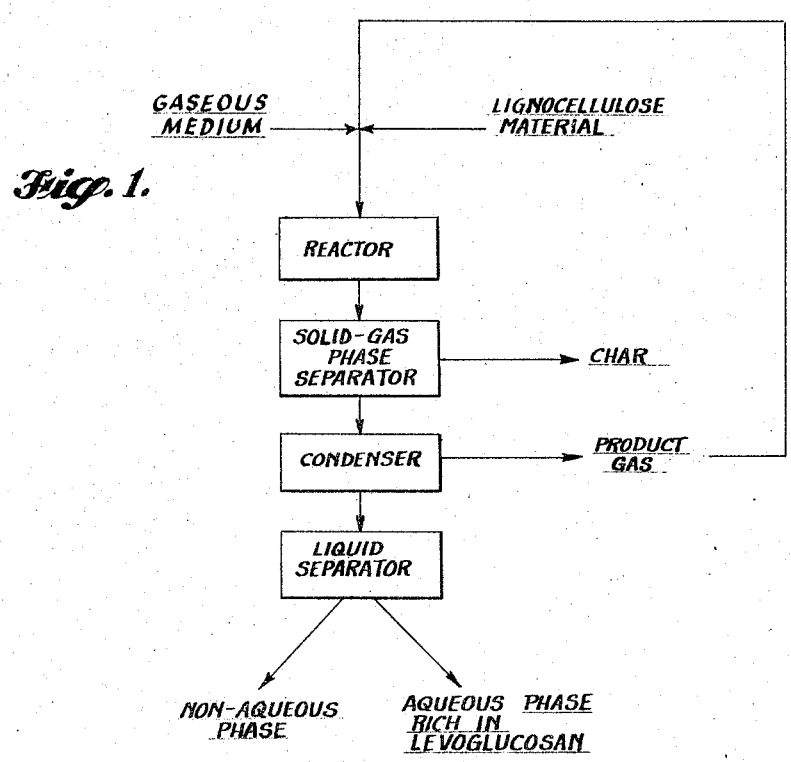
Figure 2:
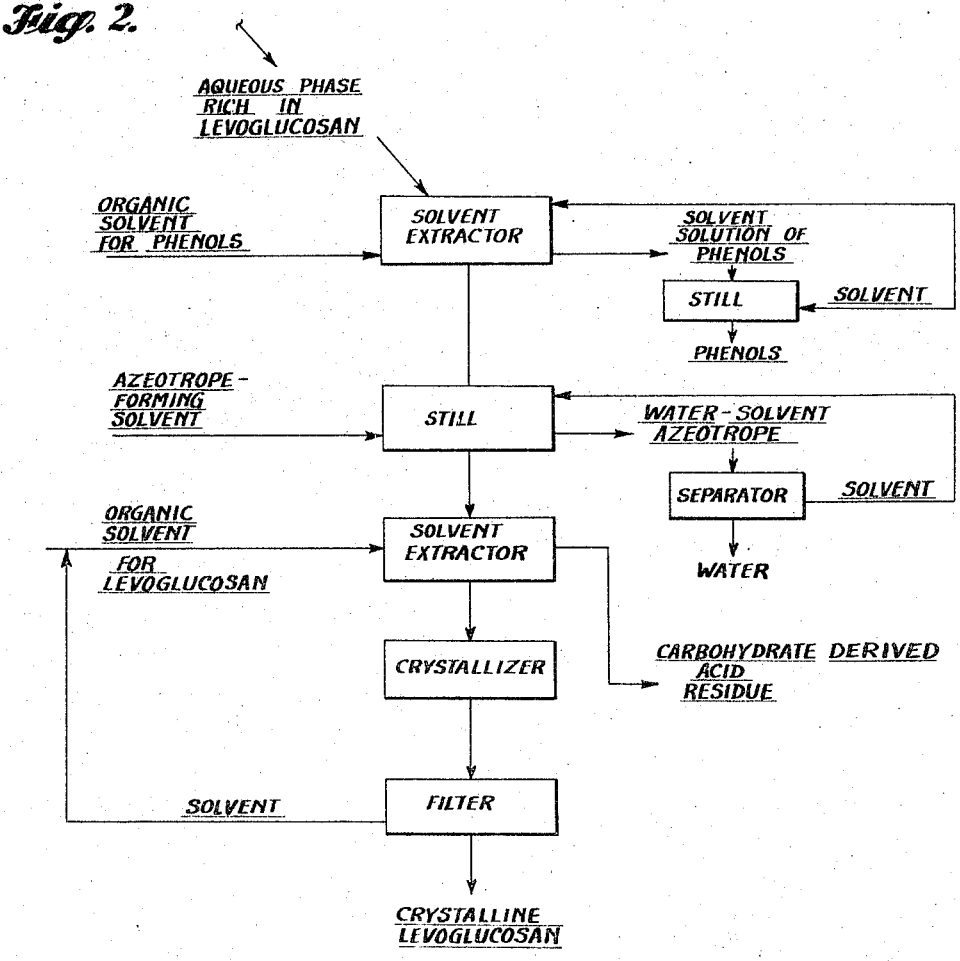

March 14, 1967  A. K. ESTERER  3,309,356
SEPARATING LEVOGLUCOSAN AND CARBOHYDRATE ACIDS FROM
AQUEOUS MIXTURES CONTAINING THE
SAME-BY SOLVENT EXTRACTION
Filed July 6, 1965  2 Sheets-Sheet 1

INVENTOR.
ARNULF K. ESTERER

BY
ATTORNEYS

March 14, 1967  A. K. ESTERER  3,309,356
SEPARATING LEVOGLUCOSAN AND CARBOHYDRATE ACIDS FROM
AQUEOUS MIXTURES CONTAINING THE
SAME-BY SOLVENT EXTRACTION
Filed July 6, 1965  2 Sheets-Sheet 2

INVENTOR.
ARNULF K. ESTERER
ATTORNEYS 3,309,356
SEPARATING LEVOGLUCOSAN AND CARBOHYDRATE ACIDS FROM AQUEOUS MIXTURES CONTAINING THE SAME—BY SOLVENT EXTRACTION
Arnulf Karl Esterer, Longview, Wash., assignor to Weyerhaeuser Company, Tacoma, Wash., a corporation of Washington
Filed July 6, 1965, Ser. No. 471,504
12 Claims. (Cl. 260—209)

This is a continuation-in-part of my copending application Ser. No. 325,659, filed Nov. 22, 1963, and now abandoned.

This invention relates to the separation of levoglucosan and carbohydrate derived acids from aqueous mixtures in which they are contained.

Levoglucosan is a cellulose derivative which potentially is useful as a raw material for the large scale production of plasticizers, explosives, propellants, surfactants, plastics, resins and other products. The low molecular weight carbohydrate derived acids, including the saccharic and saccharinic acids, are useful potentially as raw materials for the synthetic organic chemical industry and also as substitutes for citric acid in the foodstuffs industry.

Both levoglucosan and the carbohydrate derived acids are of particular interest economically since they are derivable from wood and other lignocellulose materials of very low cost. Their production accordingly affords a possible commercial utilization and economic upgrading of waste such as sawdust, chips and shavings.

Although heretofore it has been recognized that lignocellulose materials may be converted by pyrolysis to degradation products containing levoglucosan and the carbohydrate derived acids, the commercial application of this knowledge has been retarded by the difficulty of separating these two products. In the first place, they are not amenable to separation by conventional fractionation procedures. Secondly, levoglucosan, being a sugar derivative, is difficult to isolate in crystalline form from aqueous mixtures, particularly from the complex aqueous mixtures generated by the degradation of lignocellulose.

Accordingly, it is the general object of the present invention to provide a commercially applicable process for the separation of levoglucosan and the carbohydrate derived acids from aqueous mixtures in which they are contained, and for the isolation of the levoglucosan in crystalline form.

It is another object of the invention to provide an economical and practical process for the production of levoglucosan and the carbohydrate derived acids by pyrolyzing wood and thereafter recovering the levoglucosan and carbohydrate derived acid products from the resulting complex mixture of pyrolytic degradation products, in high yields and as commercially useful products.

The process of the invention is based on the discovery that, although levoglucosan is extremely difficult to separate from the carbohydrate derived acids when both are dissolved in a common aqueous solution, they may be separated completely and with facility by first removing the water component of the solution and then applying a suitable selective solvent for the levoglucosan.

Thus, in carrying out the process, the aqueous mixture first is treated with an azeotrope-forming solvent, after which the resulting mixture is distilled for removing the water by azeotropic distillation. This leaves a water-free mixture of levoglucosan and the carbohydrate derived acids. The former is separated from the latter by application of a solvent, particularly methyl isobutyl ketone, in which the levoglucosan selectively is soluble. The resulting levoglucosan solution then is separated from the resulting insoluble residue of carbohydrate derived acids, after which the levoglucosan is crystallized from the solvent medium in which it is contained.

This leads to the production of a high yield of white, crystalline levoglucosan and solid, carbohydrate derived acid products which are well suited for use in their various applications.

Although the aqueous mixture containing dissolved levoglucosan and carbohydrate derived acids which is the subject mater of the present invention may be derived from various sources, it is contemplpated particularly that its source shall be the pyrolytic degradation of lignocellulose materials under controlled conditions favoring the production of levoglucosan, which is a first product of the degradation, and minimizing its secondary conversion to tar, char and gaseous products. When this is the case, there is obtained as a product of the pyrolysis an aqueous mixture containing levoglucosan and carbohydrate derived acids which is particularly well suited to the herein-described separation.

Accordingly, as raw materials for the presently described process, there may be employed such lignocellulose materials as sugarcane bagasse, cornstalks, corncobs, the bark of trees and, particularly, the wood of various species of trees. Thus there may be employed such waste wood products as sawdust, wood chips, wood flakes and wood shavings which are available in very large quantity at low cost and which presently comprise waste by-products of the lumber industry.

When used as described herein, the lignocellulose raw material need not be pretreated, as by prehydrolyzing or solvent extracting. However, it should be reduced in size to the form of small pieces which are suspendable in a gaseous medium. Although the size of the pieces is subject to some variation, a product which will pass a 4-mesh sieve, U.S. Sieve Series, is suitable for the present purpose. Where sawdust is the starting material, it advantageously may be passed through a screen in order to screen out any large splinters or other large pieces which might interfere with the processing of the material.

It also is desirable to control the moisture content of the lignocellulose starting material to a level of less than 5% by weight. This is desirable in order to avoid the economic loss which would result from vaporizing a large amount of water. It also is desirable in order to maintain the temperature within the reactor at the desired and necessary levels.

The drying of the material may be accomplished in any suitable manner, preferably by suspension drying in hot gas, or merely by air drying, to a moisture content of from 2-5%.

As is indicated in the drawing, which consists of a flow plan of the present procedure, the first step in the process is introducing the sawdust or other lignocellulose starting material and a suitable gaseous medium into a reactor. Although a variety of gases may be employed for this purpose, the one selected should be substantially free of oxidizing effects under the pyrolytic conditions, nonexplosive, and preferably nontoxic. Suitable gases accordingly comprise nitrogen, carbon dioxide, steam and product gas, i.e., the noncondensable gaseous product resulting from the pyrolytic degradation of the lignocellulose.

Steam may be employed to advantage as a carrier gas since it has a high heat capacity and heats the lignocellulose rapidly to the reaction temperature. Also, during the condensation of the condensable gases in the product, the steam is converted to water and helps to complete the condensation of tar aerosols or smokes which are present in substantial proportion and which are difficult to condense. Still further, by controlling the amount of steam used as a carrier, the degree of dilution of the aqueous phase product may be controlled as required for further processing.

When steam is used, however, it should be employed as superheated steam rather than as saturated steam. This is desirable to insure proper heating and also to prevent excessive water dilution of the product.

The noncondensable gaseous product of the pyrolytic reaction, i.e., "product gas" also may be employed to advantage as the gaseous gas. Although its composition is somewhat variable, it comprises predominantly carbon dioxide, carbon monoxide, methane and small amounts of unsaturated hydrocarbons. These gaseous products are produced in sufficient quantity to serve as a suspending and entraining medium, to fill the system completely, and to make up any gas losses.

Whatever its identity, the gas is preheated to a temperature sufficient to bring the lignocellulose material to pyrolyzing temperature when it is mixed with gas. Accordingly, it is preheated to a temperature which when it is mixed in the predetermined ratio with the solid particles of lignocellulose will bring the lignocellulose material to a temperature within the range of, broadly, from 600–1500° F.

The gas-to-particle ratio employed is dependent upon various factors such as the nature and capacity of the reactor employed, the identity of the lignocellulose, the size of the lignocellulose pieces and the procedure by which the reaction products are processed. Sufficient gas must be employed to suspend and transport the particles through the processing stages. On the other hand, if too high a proportion of gas is employed, the procedure becomes uneconomical and it becomes difficult to fractionate the products of the reaction.

In general, a ratio of from 20 to 150 standard cu. ft. of carrier gas for each pound of lignocellulose may be employed.

The reactor into which the gas-suspended particles are introduced may be of any type suitable to contain a pyrolytic reaction of the character contemplated. In general, it comprises a chamber of size sufficient to give the desired dwell time and provided with an inlet for the gaseous stream and the product to be pyrolyzed, and an outlet for passage of the char and gaseous products of reaction.

Means are associated with the reactor for controlling its temperature carefully, since the temperature is critical in determining the yield of levoglucosan product. Such means may include means for applying heat, particularly where the raw material has a high moisture content.

Also, if desired, means may be provided for evacuating the reaction chamber since it has been found that when the pyrolysis is carried out under a vacuum of less than 100 mm., preferably less than 25 mm., the yield of char is decreased and the yield of liquid products, including levoglucosan, is increased materially. Other advantages of operating under diminished pressure are: rapid removal of the products, and the possibility of varying and controlling the product yields within wide limits.

If desired, a reactor of the fluidized bed type may be employed for achieving the foregoing purposes. In such a reactor the particles of lignocellulose and heated gas are introduced together or separately at relative rates such as to establish a zone wherein is present an agitated or fluidized bed of the particles. As the pyrolysis proceeds, the solid particles are converted to char which, being relatively light, is carried out of the reactor by the gas stream.

Also, by regulating the velocity of the stream relative to the dimensions of the reactor and the rate of feed of the materials put into the reactor, the gaseous products of the reaction may be removed from the reaction zone substantially as soon as they are formed, i.e., within a matter of a few seconds. As pointed out above, this is critical if pyrolytic degradation of the levoglucosan product is to be prevented and a high yield of that product obtained.

The temperature prevailing within the reactor is maintained within a range of, broadly, from 600–1500° F. To cause the production of a particularly high yield of levoglucosan, the reactor temperature preferably is maintained within the range of 700–1100° F.

By adjustment of the gas flow rate the exposure of the pyrolysis gases to high temperature is kept at a minimum, since they are swept from the reactor substantially as soon as they are formed. It thus is possible to secure a time-at-temperature of the gaseous product not exceeding 30 seconds, preferably not exceeding 15 seconds, the selected reaction time depending primarily upon the particle size and the temperature of pyrolysis. This is in sharp contrast to the old wood carbonizing techniques which required many hours to complete.

Maintaining the reaction time at a relatively low value prevents excessive char formation and minimizes the occurrence of secondary reactions of decomposition or repolymerization of the levoglucosan. In other words, as between the competing reactions occurring in the reactor, rapid removal of the levoglucosan is critical in favoring the conversion of cellulose to levoglucosan and preventing the further decomposition or change of that product into unwanted by-products.

Although it is necessary to remove the condensable gas component of the reaction product rapidly from the reactor, the same consideration does not apply to the solid component, i.e., to the char, which may be maintained in the reaction zone for a longer period of time. This is a situation which may occur in an activated bed reactor in which the gaseous reaction product is withdrawn substantially immediately while the solid component may remain within the reactor for a longer period of time until its conversion to char and gaseous products has been completed.

Although the composition of the product leaving the reactor is somewhat variable it contains broadly from 10 to 50% by weight char, from 15 to 60% fixed noncondensable gases and from 20 to 65% condensable gases. This mixture is processed for separation of its components.

As indicated in the flow plan, the first stage in the separation comprises passing the mixture through a solid-gas phase separator which may comprise a cloth filter, a centrifuge, or, preferably, a cyclone separator. During the separation the separator is kept hot, at a temperature above the condensation temperature of the condensable gases, in order to eliminate plugging of the separator elements with tar and to prevent loss of valuable volatile products. Also, the dwell time in the hot separator is kept at a minimum, i.e., not over a few seconds, in order to prevent or minimize decomposition of the levoglucosan.

The solid product leaving the separator comprises char, which has a fixed carbon content of the order of 65–90% by weight in the event that the conversion of the lignocellulose starting material in the reactor has been substantially complete. The fixed carbon level may be varied by control of the operating variables, however, as determined by the end use to which the product is to be put. Thus when it is to be used as absorption charcoal it should be substantially free from tar. However, if it is to be applied to the manufacture of fuel briquets, a lower carbon content is permissible, the increased tar content serving as an adhesive to bind the char particles into briquets.

The gaseous product leaving the solid-gas phase separator comprises both condensable and noncondensable gases. It next is processed for separating these two classes of gaseous products.

Accordingly, it is passed through a condenser unit which, for efficient recovery of the condensable materials, may comprise a battery of individual, water-cooled, corrosion-resistant condensers connected in series. As noted above, where superheated steam comprises the carrier gas, the steam condensed into water at this stage serves to dilute the condensed product to a degree which renders it suitable for further processing.

As products of the condensing stage, there are obtained a gaseous product, i.e., "product gas," and a liquid product.

The "product gas" is obtained in a yield of 15 to 60% by weight, based on the dry starting material. It contains carbon dioxide, carbon monoxide, methane and other saturated hydrocarbons, and a small amount of ethylene and other unsaturated hydrocarbons. Its exact composition varies, depending primarily upon the temperature of the pyrolysis. Typical compositions when pyrolyzing Douglas fir sawdust at 850 and 1100° F., respectively, are given below, in weight percent:

| Temp. °F. | Carbon Dioxide | Carbon Monoxide | Saturated Hydrocarbons as Methane | Unsaturated Hydrocarbons as Ethylene | Oxygen |
|---|---|---|---|---|---|
| 850 | 30 | 50 | 12 | 3 | 1.5 |
| 1,100 | 40 | 35 | 18 | 2 | 1 |

The "product gas" thus obtained has several important potential applications. In view of its high carbon monoxide content it may be used as a fuel or, after washing out its carbon dioxide content with lime, as a raw material for carbon monoxide synthesis. In the alternative, the product gas may be employed without fractionation or further treatment as the carrier gas required for the presently described pyrolysis.

The liquid product is obtained in the first instance as a light brown liquid which separates upon standing into a nonaqueous phase and an aqueous phase. These two phases may be separated by processing the total liquid product in a liquid separator of suitable construction. This results in the separation of a nonaqueous phase fraction comprising about 20 to 60% by weight of the total liquid product and an aqueous phase fraction comprising from 40 to 80% of the total liquid product.

The nonaqueous phase consists principally of tars and phenolic bodies such as guaiacol, the cresols, creosol, and the higher phenols. They are obtained in a yield of from 4 to 35% by weight, based on the dry weight of the starting material, and may be applied to the various industrial uses to which such materials are applicable either as a gross product or after fractionation.

The aqueous phase is made up of a solid component dissolved in an aqueous liquid. The aqueous liquid comprises principally water, but includes also appreciable quantities of formic acid, acetic acid, and soluble phenols.

The solid content of the aqueous phase represents from 14 to 38% by weight of the total oven dry lignocellulose material. It consists of various carbohydrate fragments, including levoglucosan and carbohydrate derived acids such as humic, saccharic, saccharinic acids and other oxidized polymeric carbohydrate material. In addition, an appreciable proportion of phenolic compounds may be present, the proportion being dependent upon the partition coefficient of such compounds between the nonaqueous and aqueous phases.

The levoglucosan content of the aqueous phase may be separated from the carbohydrate derived acid content by first removing the water from the aqueous phase and then taking advantage of the selective solubility of the levoglucosan in particular organic solvents. In this sequence, the solvents are made to serve three distinct functions, i.e., a washing function, a water-removing function and a selective dissolving function.

The first solvent use is applied to the gross aqueous phase with the object in mind of removing its dissolved phenol content in order that the phenols will not interfere with the subsequent separation and will not contaminate the ultimate products.

Accordingly, the gross aqueous phase is washed with a cold low molecular weight, water insoluble, aliphatic organic solvent for phenols. Such solvents comprise broadly the lower aliphatic alcohols, esters, ethers and ketones having from 4 to 10 carbon atoms, inclusive. Examples are the butanols, the amyl alcohols, ethyl acetate, butyl acetate, diethyl ether, methyl isopropyl ether, methyl isobutyl ketone and the like. These remove preferentially the small quantities of phenolic materials which may be present and which might interfere with the subsequent separation. The resulting solution may be distilled for recovery of the solvent and phenols, the solvent being recycled.

Next, an azeotrope-forming solvent is mixed with the solvent-washed aqueous phase in order to make it possible to remove the water content of the phase by azeotropic distillation. This is a particularly suitable manner of removing the water since azeotropes may be created which boil at a very low temperature. As a result, the water may be removed without elevating the temperature of the levoglucosan to a level at which it will decompose, or become further degraded. Any azeotrope forming liquid may be used for this purpose, whether or not it is soluble in water. Preferred azeotrope-forming liquids are those which form azeotropes boiling at relatively low temperatures, i.e., below 300° F., to avoid thermal decomposition of the levoglucosan. Examples are the lower aliphatic alcohols, esters, ethers and ketones having from 4 to 10 carbon atoms, inclusive. Specifically, butanol, methyl isobutyl ketone and toluene may be used to advantage as azeotrope-forming solvents.

A sufficient amount of the azeotrope-forming solvent is added to remove substantially all of the water from the mixture upon distillation. After the distillation, which may be carried out in vacuo, if desirable or necessary the solvent components of the azeotrope may be separated from the water and recycled to the treatment of a further quantity of starting material.

The product remaining from the azeotropic distillation comprises a substantially water-free mixture of levoglucosan and the carbohydrate derived acids. To this mixture is applied an organic solvent for selective removal of its levoglucosan content.

Solvents which may be employed for this purpose comprise the lower aliphatic ketone, alcohol, ester, and ether solvents, i.e., those containing from 4–10 carbon atoms. Illustrative ones are methylethyl ketone, methyl isobutyl ketone, amyl alcohol, the hexyl alcohols, amyl acetate, methyl isopropyl ether, 1,4-dioxane, the monoethyl ether of glycol monoacetate ("Cellosolve acetate").

The particular solvent employed should be characterized by having the ability preferentially to dissolve the levoglucosan. Also, the solubility curve of the levoglucosan in the solvent should be characterized by a slope sufficiently steep to make possible effective crystallization of the separated levoglucosan from the solvent medium.

It is to be noted that of the various solvents which may be employed for any one of the three solvent applications required by the present invention, methyl isobutyl ketone is preferred for several reasons. First, it serves advantageously all three functions, i.e., that of washing out the phenols from the original aqueous phase, that of forming an azeotrope with the washed aqueous phase, and that of serving as a selective solvent for the levoglucosan content of the dehydrated product remaining after removal of the water from the aqueous phase. This desirable feature greatly simplifies the processing operations.

Also, the solvent characteristics of methyl isobutyl ketone are such as to make it ideally suited for the present purposes. Whereas levoglucosan is only very slightly soluble in cold methyl isobutyl ketone, it is soluble to a high degree in that solvent when hot. This makes it possible to use the solvent for washing the original aqueous phase for phenol removal, without at the same time removing an appreciable proportion of the levoglucosan.

Third, methyl isobutyl ketone forms with water an azeotrope which may be distilled at a low temperature, i.e., at about 190° F. Hence it may be used to advantage for dehydrating the aqueous phase without danger of degrading its levoglucosan content.

Still further, the application of methyl isobutyl ketone is desirable commercially because of its availability, relatively low cost, and desirable handling characteristics.

Accordingly, the levoglucosan-carbohydrate derived acid mixture is separated by treating it with methyl isobutyl ketone or other hot organic solvent used in an amount and at a temperature sufficient to dissolve preferentially the levoglucosan content of the mixture. The resulting solution then is separated from the resulting carbohydrate derived acid residue by decantation, filtering or other appropriate means.

The carbohydrate derived acid residue may be washed with further quantities of solvent and dried, the washings being combined with the levoglucosan solution. The residue then may be separated further into its component acids or used as a gross product in its various industrial applications.

The hot solvent solution of the levoglucosan is passed to a crystallizing apparatus of suitable design, for example, to a continuous crystallizer equipped with means for back feeding the solution. Upon lowering the temperature, the levoglucosan separates out as a white, crystalline product.

The particular temperature employed for extracting the crude levoglucosan-containing mixture and for crystallizing the extracted levoglucosan will depend, of course, upon the particular solvent employed and the concentration of the solution. In general, however, the extraction step may be effectuated to advantage at a temperature of from 100° F. to the boiling point of the solvent, and the crystallizing step at a reduced temperature of from the freezing point of the solvent to 60° F.

The crystallized levoglucosan is filtered from the mother liquor and washed, after which it is ready for use. The mother liquor and washings are recycled to the solvent extractor for treatment of a further quantity of starting material. As a result of this procedure there are obtained yields of levoglucosan and carbohydrate derived acids of the order of 5 to 30%, and 8 to 25%, respectively, based on the dry weight of the lignocellulose starting material.

The process of the invention is illustrated by the following examples:

Example I

An aqueous mixture containing dissolved levoglucosan and carbohydrate derived acids was prepared from Douglas fir sawdust.

The sawdust, screened to a −4 mesh and having a moisture content of about 5%, was mixed continuously with hot product gas in the gas:wood ratio of about 95 standard cubic feet of gas for each pound of sawdust. The gas was preheated to a temperature of 1500° F.

The resulting suspension of sawdust particles in gas was passed continuously into a agitated bed reactor equipped with heating means for maintaining a reaction temperature of 750 to 800° F.

As the pyrolysis proceeded, the gaseous products of the reaction were withdrawn continuously from the reactor after a residence time of about 2 seconds.

The total product comprising char, condensable gases and condensed gases was passed quickly through an insulated cyclone separator maintained at a temperature just above the condensation temperature of the condensable gases contained in the product. This resulted in the separation of a char product containing about 70% fixed carbon, in a yield of 20% by weight, based on the weight of the original starting material, oven dry basis.

The gaseous product leaving the cyclone was passed through a series of water-cooled condensers which separated the condensable gases from the noncondensable gases. The latter were obtained in a yield of 15% by weight starting material and had the following percent by weight composition:

Carbon monoxide _____ 43
Carbon dioxide _____ 43
Saturated hydrocarbons as methane _____ 8
Unsaturated hydrocarbons as ethylene _____ 2
Oxygen _____ 1

The condensable gases were condensed to a brown liquid which separated into aqueous and nonaqueous phases. These were separated. The nonaqueous phase represented 21% and the aqueous phase 79% by weight of the total liquid product.

The nonaqueous phase comprised a mixture of tars and substituted phenolic materials.

A 500 pound sample of the aqueous phase was extracted at 77° F. with four separate 50-lb. portions of methyl isobutyl ketone. The extract was distilled to give a distillate containing 193 pounds of methyl isobutyl ketone and 4 pounds of water, which was recycled. It also yielded 8 pounds of nondistillable phenols.

The aqueous phase, which had been washed with methyl isobutyl ketone, then was treated with 1,769 pounds of additional methyl isobutyl ketone to form an azeotrope boiling at about 190° F. The azeotrope was distilled until all of the water had been removed. The distillate was separated to give 396 pounds of water and 1,229 pounds of methyl isobutyl ketone, which was recycled.

The resulting substantially anhydrous mixture of levoglucosan and carbohydrate derived acids contained 540 pounds of methyl isobutyl ketone. It was heated in a solvent extractor at a temperature of about 240° F., and filtered hot. This gave a residue of 58 pounds of carbohydrate derived acids. It also gave a filtrate comprising a solution of levoglucosan and methyl isobutyl ketone.

The filtrate was cooled to 32° F. whereupon the levoglucosan separated as a white, crystalline product. This was filtered to give a yield of 33.3 pounds of levoglucosan. The filtrate, consisting of 540 pounds of methyl isobutyl ketone containing 0.7 pound of levoglucosan, was recycled.

Example II

In a manner similar to that described above in Example I, levoglucosan and the carbohydrate derived acids are made from wood sawdust, using 1,4-dioxane, in place of methyl isobutyl ketone as the solvent employed for the selective removal of the levoglucosan content of the dehydrated mixture of levoglucosan and carbohydrate derived acid product.

Example III

In a manner similar to that described above in Example I, levoglucosan and the carbohydrate derived acids are made from wood sawduct, using the monoethyl ether of glycol monoacetate ("Cellosolve acetate") in place of methyl isobutyl ketone as the solvent employed for the selective removal of the levoglucosan content of the aqueous phase.

Example IV

In a manner similar to that described above in Example I, levoglucosan and the carbohydrate derived acids are made from wood sawdust, using a mixture of amyl alcohols ("Pentasol") in place of methyl isobutyl ketone as the solvent employed for the selective removal of the levoglucosan content of the aqueous phase.

Example V

In a manner similar to that described above in Example I, levoglucosan and the carbohydrate derived acids are made from wood sawdust, using n-butanol in place of methyl isobutyl ketone as the solvent employed for the selective removal of the levoglucosan content of the dehydrated mixture of levoglucosan and carbohydrate derived acid product.

Having thus described the invention in preferred embodiments, what is claimed as new and desired to protect by Letters Patent is:

I claim as my invention:

1. The process of separating aqueous mixtures containing dissolved levoglucosan and carbohydrate derived acids, the process comprising:
   (a) removing the water content of the aqueous mixture,
   (b) adding to the resulting mixture of levoglucosan and carbohydrate derived acids a selective organic solvent for the levoglucosan,
   (c) separating the resulting solution of levoglucosan from the resulting residue of carbohydrate derived acids,
   (d) crystallizing the levoglucosan from the solvent, and
   (e) separating the crystalline levoglucosan product from the resulting mother liquor.

2. The process of claim 1 wherein the selective organic solvent for the levoglucosan comprises a lower aliphatic ketone having from 4–10 carbon atoms inclusive.

3. The process of claim 1 wherein the selective organic solvent for the levoglucosan comprises methyl isobutyl ketone.

4. The process of claim 1 wherein the selective organic solvent for the levoglucosan comprises a lower aliphatic alcohol having from 4–10 carbon atoms.

5. The process of claim 1 wherein the selective organic solvent for the levoglucosan comprises amyl alcohol.

6. The process of claim 1 wherein the selective organic solvent for the levoglucosan comprises a lower aliphatic ester having from 4–10 carbon atoms.

7. The process of claim 1 wherein the selective organic solvent for the levoglucosan comprises amyl acetate.

8. The process of claim 1 wherein the selective organic solvent for the levoglucosan comprises a lower aliphatic ether having from 4–10 carbon atoms.

9. The process of claim 1 wherein the selective organic solvent for the levoglucosan comprises methyl isopropyl ether.

10. The process of claim 1 wherein the aqueous solution of levoglucosan and carbohydrate derived acids contains phenolic materials and including the step of washing the solution with a selective organic solvent for the phenolic materials preliminary to removing the water therefrom.

11. The process of separating aqueous mixtures containing dissolved levoglucosan and carbohydrate derived acids, the process comprising:
    (a) adding to the aqueous mixture an azeotrope-forming amount of an organic solvent,
    (b) removing the water content of the mixture by distilling off the resulting azeotrope,
    (c) adding to the resulting mixture of levoglucosan and carbohydrate derived acids a selective organic solvent for the levoglucosan,
    (d) separating the resulting solution of levoglucosan from the resulting residue of carbohydrate derived acids,
    (e) crystallizing the levoglucosan from the solution, and separating the crystalline levoglucosan product from the resulting mother liquor.

12. The process of separating aqueous mixtures containing dissolved levoglucosan, carbohydrate derived acids and phenolic materials, the process comprising:
    (a) washing the aqueous mixture with cold methyl isobutyl ketone solvent for removal of the phenolic materials,
    (b) adding to the resulting washed mixture an azeotrope-forming amount of methyl isobutyl ketone,
    (c) removing the water content of the mixture by distilling off the resulting water-methyl isobutyl ketone azeotrope,
    (d) adding to the resulting mixture of levoglucosan and carbohydrate derived acids methyl isobutyl ketone at a temperature of between 160° F. and the boiling point of the methyl isobutyl ketone,
    (e) separating the resulting hot solution of levoglucosan from the resulting residue of carbohydrate derived acids,
    (f) cooling the hot solution for crystallization of the levoglucosan,
    (g) and separating the crystalline levoglucosan product from the cold solvent mother liquor.

No references cited.

ELBERT L. ROBERTS, *Primary Examiner.*

JOHNNIE R. BROWN, *Assistant Examiner.*